A. M. LEONI.
FRONT AXLE CONSTRUCTION.
APPLICATION FILED NOV. 25, 1919.

1,426,302.

Patented Aug. 15, 1922.

Inventor
Alfonso M. Leoni
By
Jac. A. Richmond
Attorney

UNITED STATES PATENT OFFICE.

ALFONSO M. LEONI, OF PHILADELPHIA, PENNSYLVANIA, ASSIGNOR, BY MESNE ASSIGNMENTS, TO STEINMETZ ELECTRIC MOTOR CAR CORPORATION, OF BALTIMORE, MARYLAND, A CORPORATION OF MARYLAND.

FRONT-AXLE CONSTRUCTION.

1,426,302.     Specification of Letters Patent.     Patented Aug. 15, 1922.

Application filed November 25, 1919. Serial No. 340,550.

*To all whom it may concern:*

Be it known that I, ALFONSO M. LEONI, a citizen of the United States, residing at Philadelphia, in the county of Philadelphia and State of Pennsylvania, have invented certain new and useful Improvements in Front-Axle Constructions, of which the following is a specification.

This invention relates to a three-point suspension for motor trucks or vehicles, wherein an extremely simple type of mounting is provided between the vehicle frame and the front axle, the movable parts of which are well protected while yet readily accessible.

The improved suspension mounting involves a cross-frame having removable rigid connection with the longitudinal main frame bars of the vehicle, which frame has depending plate portions to extend beyond and on opposite sides of a housing recess formed in the front axle. A pedestal base is pivotally supported in said housing recess on a transverse pin, and the ends of the base, in both directions beyond the pivot pin, have a yielding connection with the cross-frame through spring pressed bolts.

In the drawings:—

Figure 1:
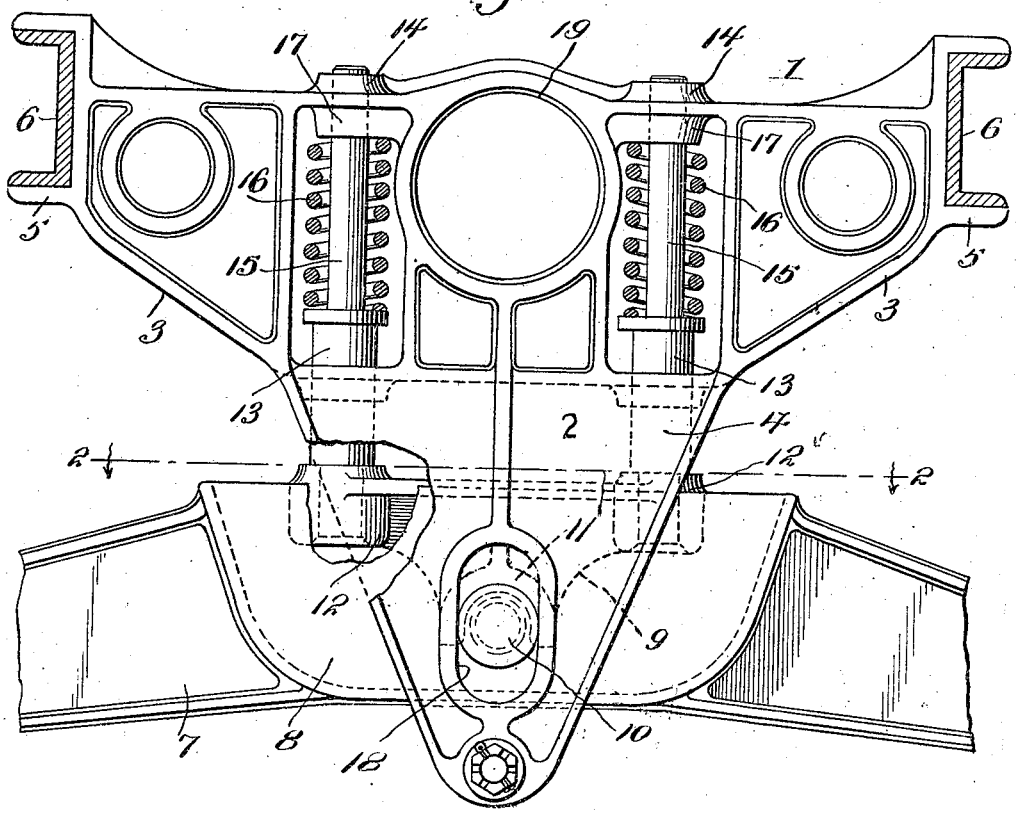
Fig. 1 is a broken view in front elevation, illustrating the improved suspension mounting.
Figure 2:
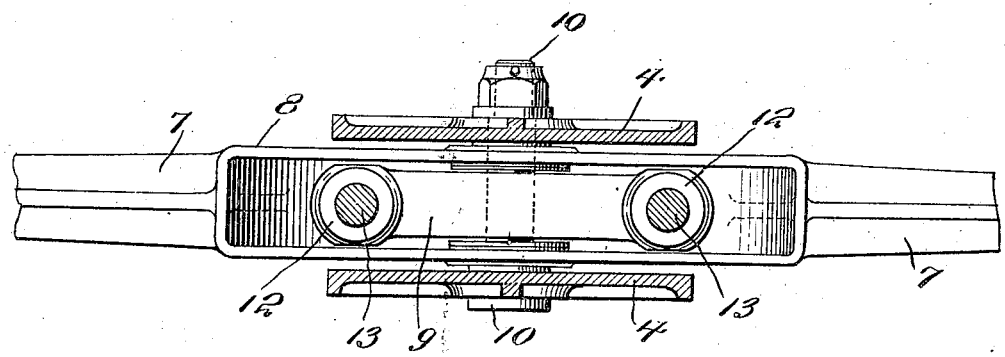
Fig. 2 is a section on line 2—2 of Fig. 1.

The improved suspension mounting comprises a cross-frame 1, having a central or body portion 2, lateral wing portions 3, and depending plates 4, all preferably constructed as an integral formation. The wing portions 3 have channeled bearing ends 5, whereby the cross-frame may be bolted or otherwise rigidly secured in a removable manner to the longitudinal frame bars 6 of the vehicle frame.

The front axle 7 of the vehicle is centrally formed with a housing recess 8, of appropriate size, the axle being reinforced or otherwise strengthened to avoid weakness at the recessed portion. A pedestal base 9 is mounted within the recess 8, on a pivot-pin 10, extending transversely of the recess and through the walls thereof. The base 9 is straight on the upper face, with a central depending portion 11 to receive the pivot-pin, and the lateral arms 12 of the base thus provided, are formed with openings to receive the lower ends of bolts 13, which extend upwardly and through the cross-frame. The bolts are fixed in the pedestal arms 12, and extend loosely through openings formed in overlying parts or partitions of the cross-frame body, with the upper terminals of the bolts provided with means, as nuts 14 to prevent complete separation of the connection, while permitting the necessary compensating movement.

The bolts 13, within the body of the cross-frame, are diametrically reduced, as at 15, and coil springs 16 encircle the reduced portions, bearing between the shoulder formed by the reduction of the bolt, or an enlargement thereon, and an abutment 17 formed or provided in the body.

The plates 4 depend from the body of the cross-frame on opposite sides of and normally below the front axle 7. These plates gradually converge toward their lower ends and are formed at appropriate points with elongated openings 18, to permit passage therethrough of the projecting ends of the pivot-pin 10, and thereby removal of such pin when disconnection of the parts is desirable.

The plates 4 serve to guide the parts in play under load strain, and to take care as a covering of moving parts.

The suspension action is apparent from the drawings; it being obvious that any surface conditions tending to a deflection of the front axle is distributed through the pedestal base and taken up by the springs 16 through movement of the bolts in the action of the pedestal base.

The cross-frame, as shown at 19, may and preferably is formed to receive the engine frame supports, so that such cross-frame may also serve as the sole support for the forward end of the engine.

Having thus described the invention, what is claimed as new, is:—

1. A motor vehicle frame suspension, comprising a cross-frame secured to the vehicle frame, a pedestal base pivotally supported in a recess in the front axle, bolts carried by said base and extending through the cross-frame, and spring means to resist the movement of said bolts.

2. A motor vehicle having the front axle formed with a recess, a pivot pin extending transversely of the recess, a pedestal base mounted on said pin within the recess, a cross-frame secured to the vehicle frame, and spring-loaded bolts connected to said base and movable within the cross-frame, said cross-frame having plates depending on both sides of the axle and formed with openings in alignment with the pivot pin.

In testimony whereof I affix my signature.

ALFONSO M. LEONI.